United States Patent
Wolff

[11] Patent Number: 5,857,314
[45] Date of Patent: Jan. 12, 1999

[54] MOWER WITH AN IMPROVED SET-DOWN MEMBER

[75] Inventor: Michel Wolff, Waltenheim-sur-Zorn, France

[73] Assignee: Kuhn S.A., Saverne Cedex, France

[21] Appl. No.: 788,401

[22] Filed: Jan. 27, 1997

[30] Foreign Application Priority Data

Jan. 31, 1996 [FR] France .................................. 96 01331

[51] Int. Cl.$^6$ .................................................. A01D 34/66
[52] U.S. Cl. .............................. 56/6; 56/15.8; 56/DIG. 14
[58] Field of Search ............................... 56/6, 14.9, 15.1, 56/15.2, 15.7, 15.8, 255, 295, DIG. 14

[56] References Cited

U.S. PATENT DOCUMENTS

| | | |
|---|---|---|
| Re. 34,417 | 10/1993 | Werner et al. . |
| 3,293,835 | 12/1966 | Gehman et al. ............... 56/15.2 X |
| 4,343,138 | 8/1982 | Neuerburg . |
| 4,426,828 | 1/1984 | Neuerburg . |
| 4,428,185 | 1/1984 | Toillie et al. . |
| 4,443,998 | 4/1984 | Neuerburg . |
| 4,452,034 | 6/1984 | Neuerburg . |
| 4,525,987 | 7/1985 | Werner et al. . |
| 4,557,104 | 12/1985 | Toillie et al. . |
| 4,610,128 | 9/1986 | Ermacora . |
| 4,633,656 | 1/1987 | Willinger . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,730,445 | 3/1988 | Wolff . |
| 4,761,940 | 8/1988 | Wolff . |
| 4,763,463 | 8/1988 | Ermacora et al. . |
| 4,771,591 | 9/1988 | Ermacora . |
| 4,809,488 | 3/1989 | Neuerburg et al. . |
| 4,811,553 | 3/1989 | Ermacora et al. . |
| 4,833,868 | 5/1989 | Ermacora et al. . |
| 4,848,069 | 7/1989 | Ermacora et al. . |
| 4,879,870 | 11/1989 | Neuerburg . |
| 4,896,493 | 1/1990 | Neuerburg . |
| 4,899,523 | 2/1990 | Frumholtz et al. . |
| 4,903,468 | 2/1990 | Haberkorn . |
| 4,909,023 | 3/1990 | Haberkorn et al. . |
| 4,922,693 | 5/1990 | Neuerburg . |
| 4,947,629 | 8/1990 | Ermacora et al. . |
| 4,970,848 | 11/1990 | Neuerburg et al. . |
| 4,974,399 | 12/1990 | Haberkorn . |
| 4,986,061 | 1/1991 | Frumholtz et al. . |
| 4,986,064 | 1/1991 | Ermacora . |
| 4,991,383 | 2/1991 | Ermacora . |
| 4,999,981 | 3/1991 | Neuerburg . |
| 5,060,462 | 10/1991 | Helfer et al. . |
| 5,094,063 | 3/1992 | Wattron et al. . |
| 5,101,616 | 4/1992 | Wolff . |

(List continued on next page.)

FOREIGN PATENT DOCUMENTS

| | | |
|---|---|---|
| 0 579 564 | 1/1994 | European Pat. Off. . |
| 2212995 | 8/1974 | France . |
| 2 426 396 | 12/1979 | France . |
| 2 687 039 | 8/1993 | France . |

Primary Examiner—Terry Lee Melius
Attorney, Agent, or Firm—Oblon, Spivak, McClelland, Maier & Neustadt, P.C.

[57] ABSTRACT

A mower includes a cutting mechanism extending, in a work position, transversely to the direction of travel during work; a hitch structure connectable to the hitch device of a motor vehicle; a carrying beam articulated on the one hand to the hitch structure by a first articulation and on the other hand to the cutting mechanism by a second articulation; a lightening device which includes an elastic element intended to lighten the cutting mechanism in the work position; a control device which includes a body connected to the hitch structure by a third articulation; a tie rod connected to one of the ends of said elastic element and sliding on the other hand in said body; a stop element limiting, at least in one direction, sliding of the tie rod with respect to the body; and a set-down member connected, in the set-down position, to the carrying beam by the stop element.

15 Claims, 5 Drawing Sheets

U.S. PATENT DOCUMENTS

| | | |
|---|---|---|
| 5,107,662 | 4/1992 | Haberkorn et al. . |
| 5,107,663 | 4/1992 | Wattron et al. . |
| 5,136,828 | 8/1992 | Ermacora . |
| 5,199,249 | 4/1993 | Wattron et al. . |
| 5,199,250 | 4/1993 | Ermacora et al. . |
| 5,241,809 | 9/1993 | Wolff et al. . |
| 5,353,579 | 10/1994 | Wolff . |
| 5,353,580 | 10/1994 | Wolff . |
| 5,357,737 | 10/1994 | Ermacora et al. . |
| 5,417,042 | 5/1995 | Walch et al. . |
| 5,419,106 | 5/1995 | Gemelli . |
| 5,423,165 | 6/1995 | Walch et al. . |
| 5,507,136 | 4/1996 | Walch . |
| 5,522,208 | 6/1996 | Wattron . |
| 5,566,537 | 10/1996 | Kieffer et al. . |
| 5,724,794 | 3/1998 | Wolff ............................... 56/DIG. 3 X |

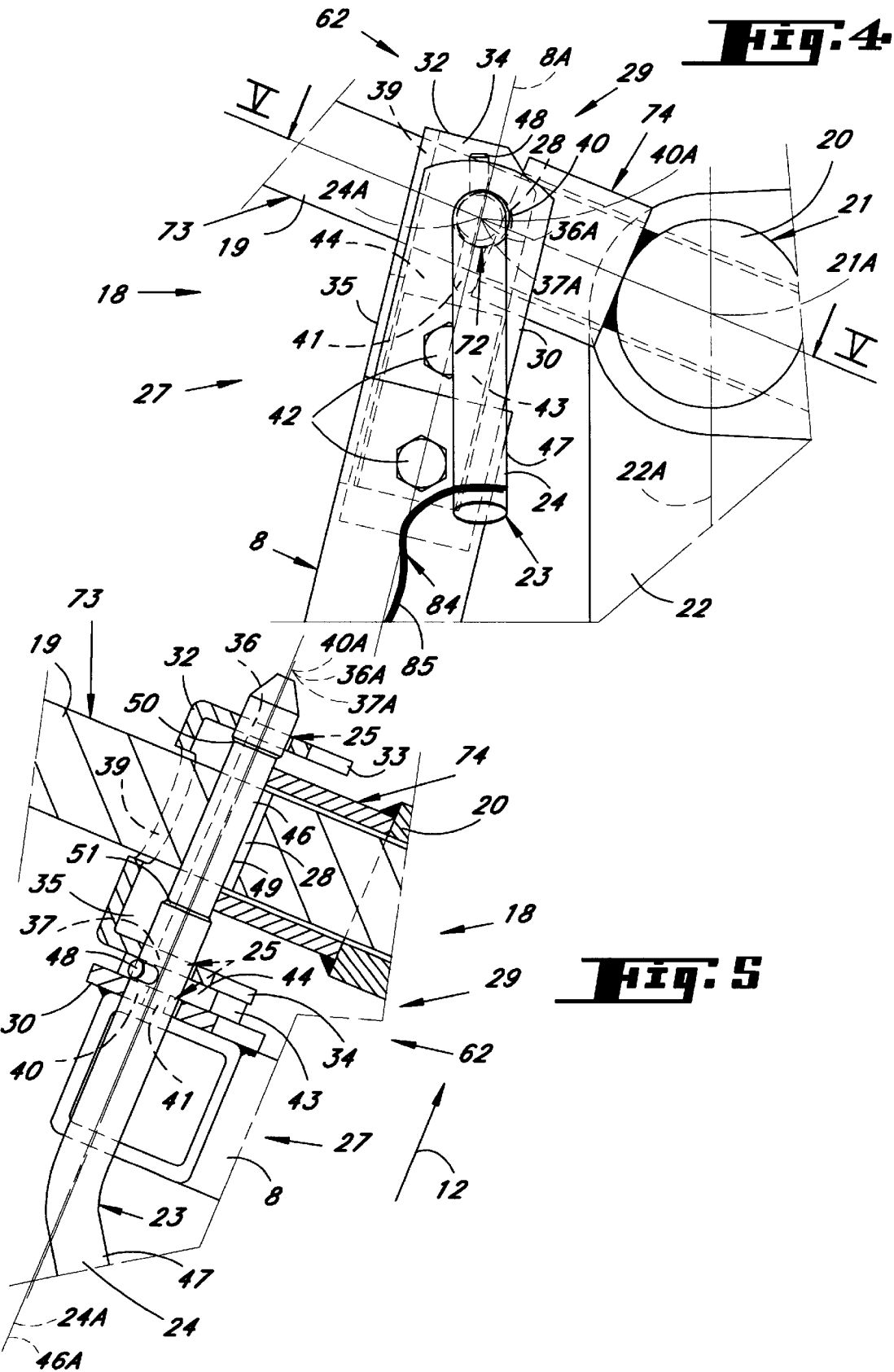

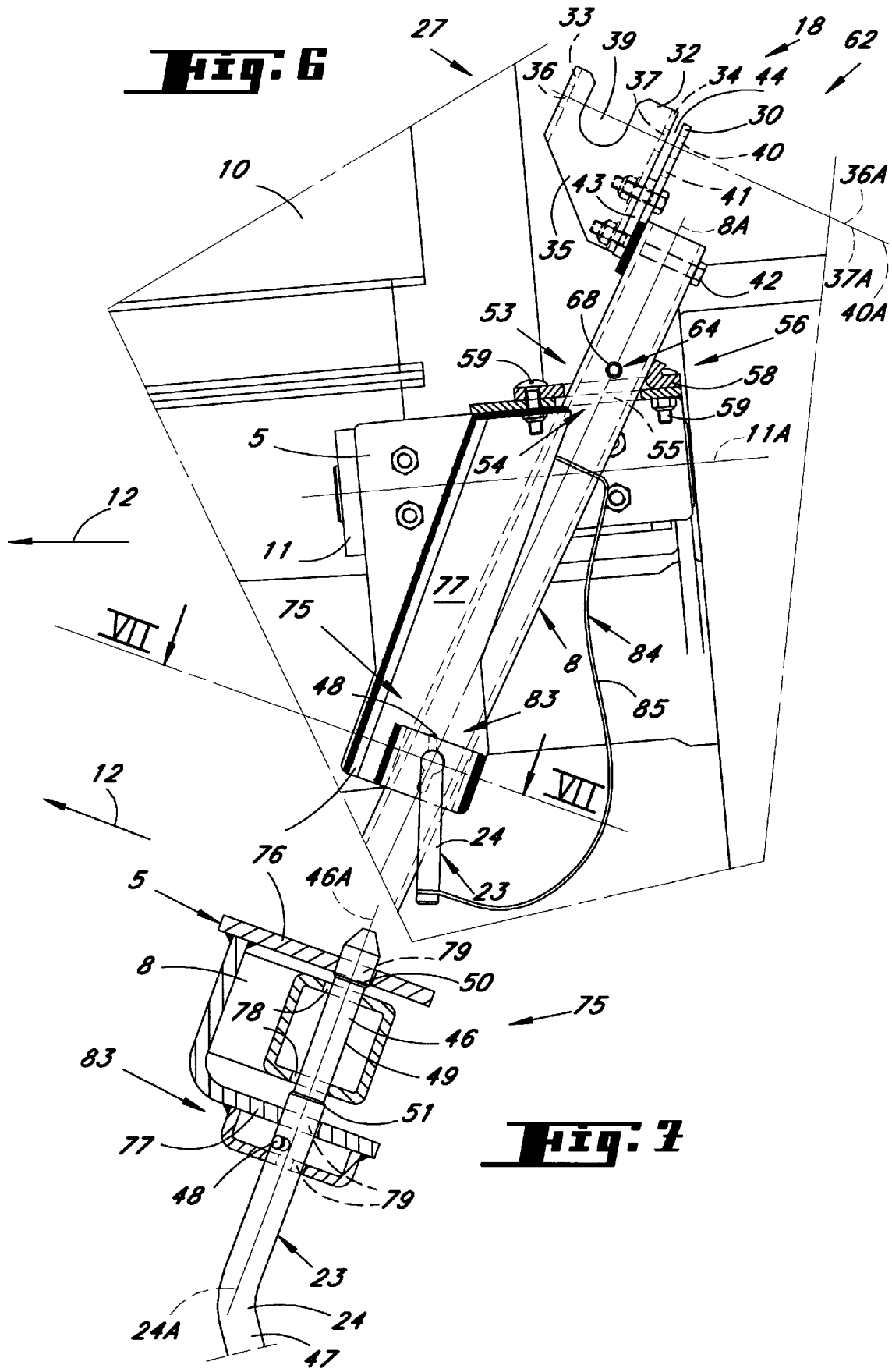

MOWER WITH AN IMPROVED SET-DOWN MEMBER

BACKGROUND OF THE INVENTION

1. Field of the Invention

The present invention relates to a mower which includes:

a cutting mechanism extending, in the work position, transversely to the direction of travel during work;

a hitch structure intended to be connected to the hitch device of a motor vehicle;

a carrying beam articulated on the one hand to the hitch structure by means of a first articulation and on the other hand to the cutting mechanism by means of a second articulation;

a lightening device which includes:
- an elastic element intended to lighten the cutting mechanism in the work position, and
- a control device which includes:
  - a body connected to the hitch structure by means of an articulation;
  - a tie rod connected on the one hand to one of the ends of said elastic element and sliding on the other hand in said body;
  - a stop element intended to limit, at least in one direction, the sliding of the tie rod with respect to the body;

a set-down member intended, in the set-down position, to be connected to the carrying beam by means of said stop element.

2. Discussion of the Background

Such a mower is known to those skilled in the art.

This known mower includes:

a cutting mechanism which extends, in the work position, transversely to the direction of travel during work;

a hitch structure intended to be connected to the hitch device of a motor vehicle;

a carrying beam which is articulated on the one hand to the hitch structure by means of a first articulation with a longitudinal axis which is at least substantially parallel to the direction of travel during work and on the other hand to the cutting mechanism by means of a second articulation with a longitudinal axis which is also at least substantially parallel to the direction of travel during work;

a lightening device which includes an elastic element intended to lighten the cutting mechanism in the work position, and a control device;

and a stand.

The control device includes a tie rod connected on the one hand to one of the ends of the elastic element and sliding on the other hand in a body connected to the hitch structure.

In the work position the sliding of the tie rod is limited in the direction of the elastic element by means of a pin which passes transversely through said tie rod and butts against the body, which makes it possible to tense the elastic element in order to lighten the cutting mechanism.

In the work position the stand is connected to the hitch structure by means of two holding studs fixed to the latter and on which said stand gets hooked by means of two holes provided in it.

It will be observed that the stand is connected to the pin by means of a cable so that it cannot be detached therefrom.

In order to bring the mower from the work position into the transport position, the operator pivots the cutting mechanism upward about the second articulation by means of an operating element.

For this purpose the elastic element is relaxed, the tie rod is slid into the body so as to disengage the pin therefrom and the cutting mechanism extends substantially vertically.

In order then to bring the mower from this transport position into the set-down position, the operator carries out the following operations:

he withdraws the pin from the tie rod in order to allow the latter to slide further into the body connected to the hitch structure when the cutting mechanism pivots downward about the second articulation and thus cancel out the action of the elastic element;

he also detaches the stand from the hitch structure in order to fix it to the beam by means of said pin;

he pivots the cutting mechanism downward;

he rests the mower on the ground by lowering the hitch device of the motor vehicle;

and he then detaches the hitch structure from said hitch device.

The mower is set down.

In order to bring the mower from the set-down position into the transport position, the operator connects the hitch structure to the hitch device of the motor vehicle, raises the mower, pivots the cutting mechanism upward, puts the pin in place in the tie rod so as to limit the travel thereof inside the body so as to tense the elastic element lightening the cutting mechanism when the latter is pivoted downward again into a work position, and stows the stand on the hitch structure.

This mower does, however, present a number of drawbacks, especially as regards the safety of the operator and the use of said mower.

As described previously, the stand is connected to the hitch structure only by means of two studs, which leaves open the possibility that the operator when hitching the mower might stow the stand in the work and transport position without making sure that the pin is correctly in place in the tie rod.

Such an oversight would result in the cutting mechanism not being lightened during work, which would lead to damage and premature wear of the mower, especially of the cutting mechanism, thus risking exposing the operator of the mower to danger, especially when the cutting mechanism includes elements driven at high speeds.

Conversely, there is the risk that the operator might not stow the stand in the intended location on the hitch structure, and this also presents risks for the user during work. In such circumstances the stand is connected to the mower only by means of the cable, and this allows said stand a great freedom of movement which may cause damage to the mower and breakage of the cable leading inevitably to the loss of the stand, which would run the risk of compromising the correct operation of other machinery used on the same plot of land for subsequent work, such as tedders, swathers, balers, silage loaders, etc.

As described earlier, the stand is connected to the hitch structure only by means of the two holding studs. It will be observed in addition that during work, especially on a difficult and uneven plot of land, there is a risk of the stand working loose from the studs and then being connected to the mower only by the cable which in this case runs the risk of breaking for the same reasons as those explained hereinabove, and leading then to the same consequences.

In such circumstances, when the cable is no longer fulfilling its function, there is then the risk that the operator, with a view to setting down the mower, might place the stand in the set-down position without removing the pin from the tie rod. In the set-down position the upper part of the stand is intended to extend inside a housing provided on the carrying beam, which housing holds said stand laterally and vertically toward the top without the pin. The pin is normally intended to hold the stand vertically toward the bottom in order to prevent it from falling out when the mower is raised.

When unhitching the mower from the motor vehicle, as the elastic element is not relaxed, there is the risk of the hitching structure pivoting violently upward about the first and second articulation under the action of the elastic element, thus exposing the operator to evident danger.

As described earlier, the stand is normally connected to the pin, by means of the cable, but the assembly formed by the stand, the cable and the pin is not secured to the mower. This stand/cable/pin assembly can easily be detached from the mower and runs the risk of being mislaid by the operator. In such circumstances the operator will tend to set down the mower by means of make-shift elements and these will have the risk of not adequately ensuring the stability of said mower and thus of exposing the operator to evident danger.

It will be further observed that the pin may, especially in the transport position and with a view to setting down the mower, easily be withdrawn from the tie rod with just one hand, and this is not favorable to operator safety. There is the risk during this operation of the operator placing his other hand in a region which could become a danger zone when the pin is withdrawn from the tie rod. His other hand could then inadvertently actuate some other device which would also run the risk of exposing the operator to danger.

SUMMARY OF THE INVENTION

The object of the present invention is therefore to overcome these drawbacks and to design a mower which is simple and reliable to use by making the operator as aware as possible of the actions he needs to perform in order to prevent him from making wrong moves which might endanger himself and/or damage the mower.

For this purpose, the mower according to the present invention is one wherein, in the work position, the set-down member is connected to the tie rod by means of said stop element.

Such a mower is simple to use and makes it possible on the one hand to overcome the aforementioned drawbacks of the known mower and on the other hand makes it possible for the operator to set it down and hitch it to the motor vehicle with great ease using a series of simple and logical manipulations.

According to an additional feature of the invention, both in the work position and in the set-down position, the set-down member is also connected to the carrying beam by means of a link making it possible better to connect the set-down member to the carrying beam in order not to mislay it.

Advantageously, the carrying beam includes, for said link, a housing through which said set-down member extends.

As a preference, the housing of the carrying beam is an opening in which the set-down member can slide so as to be brought from the work position into the set-down position or vice versa, or conversely, thus making use and manipulation of said set-down member easier.

Advantageously, to avoid mislaying the set-down member during work or during manipulation thereof, there is provided, close to each end of the set-down member, a stop intended to limit the sliding of the set-down member in the opening, thus making it impossible to detach said set-down member from the carrying beam.

According to another additional feature of the invention, in the work position, the set-down member is suspended to the tie rod of the control device by means of the stop element.

According to another additional feature of the invention:
in the work position, the set-down member extends for the most part above the carrying beam; and
in the set-down position, the set-down member extends for the most part below the carrying beam.

Such an arrangement of the set-down member especially makes it possible to place it in the work position and in the transport position with one single manual action. Furthermore, if the stop element should, for any reason whatever, no longer suspend the set-down member to the tie rod in the transport position or in the work position, then the set-down member still remains connected to the carrying beam by means of the previously described link, which makes it possible, in such circumstances, to avoid mislaying said set-down member and compromising the correct operation of other machinery used on the same plot of land.

According to another additional feature of the invention, in the work position, the stop element extends on the one hand through a first housing provided in the upper part of the set-down member and on the other hand through a second housing provided in the tie rod.

Advantageously, there is provided a locking device preventing the stop element from coming out of the second housing provided in the tie rod when the mower is in the work position.

Advantageously, the locking device involves the stop element and the upper part of the set-down member.

Such a design does not give the operator the possibility of stowing the set-down member in the work and transport position without putting the stop element in place because the set-down member and the stop element depend on one another. Conversely, it is no longer possible either for the operator correctly to connect the stop element to the tie rod without the set-down member because the latter is associated with said stop element in order to lock said stop element.

According to another feature of the invention, in order to disconnect the set-down member from the tie rod it is necessary to act simultaneously on said set-down member and on the stop element. Thus it is possible to avoid the operator or some third party actuating the locking device and disconnecting the set-down member from the tie rod inadvertently. Furthermore, the fact of acting simultaneously on the set-down member and on the stop element keeps the operator busy with both hands and makes him pay more attention to what he is doing and avoids him being exposed to any danger when bringing the set-down member into the work position or set-down position.

According to another feature of the invention, in the set-down position, the stop element extends on the one hand through a third housing provided in the middle part of the set-down member and on the other hand through a fourth housing provided in the carrying beam. In order to bring the set-down member into the set-down position the operator has necessarily to make use of the stop element in order to connect the set-down member to the carrying beam, without which element the set-down member would not be able to support the carrying beam.

According to another feature of the invention, the stop element is connected to the set-down member by means of a linking element. This linking element avoids the stop element becoming detached from the set-down member so that it cannot be lost.

Advantageously, the linking element is of a length determined so that:

the length of said linking element is short enough not to allow the set-down member to be placed in the set-down position when only the stop element is connected to the tie rod;

the length of said linking element is long enough to allow the set-down member to come at least into close proximity with the ground when only the stop element is connected to the tie rod.

Such a design does not allow the mower to be set down without cancelling out the action of lightening the cutting mechanism.

Furthermore, the fact that the set-down member comes at least into close proximity with the ground lets the operator know, especially during work, that he has committed an error in manipulation because under such circumstances the set-down member interferes with the product already mown.

According to another additional feature of the invention, the stop element is a pin.

BRIEF DESCRIPTION OF THE DRAWINGS

Further subjects and features of the invention will emerge from the description below with reference to the attached drawings which represent, by way of non-limiting examples, one embodiment of the mower according to the invention.

In these drawings:

FIG. 4 represents, in the work position, the set-down member connected to the tie rod by means of the stop element, viewed from the rear of the mower represented in FIG. 1, on a different scale;

FIG. 5 represents a view in section on the plane V—V defined in FIG. 4;

FIG. 6 represents the set-down member connected to the carrying beam of the mower represented in FIG. 3, to a different scale, and in which a few part sections have been made;

FIG. 7 represents a view in section on the plane VII—VII defined in FIG. 6, on a different scale.

DESCRIPTION OF THE PREFERRED EMBODIMENTS

The mower (1) as represented in FIGS. 1 to 7 is similar to the one described in document FR-A-2 687 039. For further details reference will, if necessary, be made to the text of said document.

Figure 1:
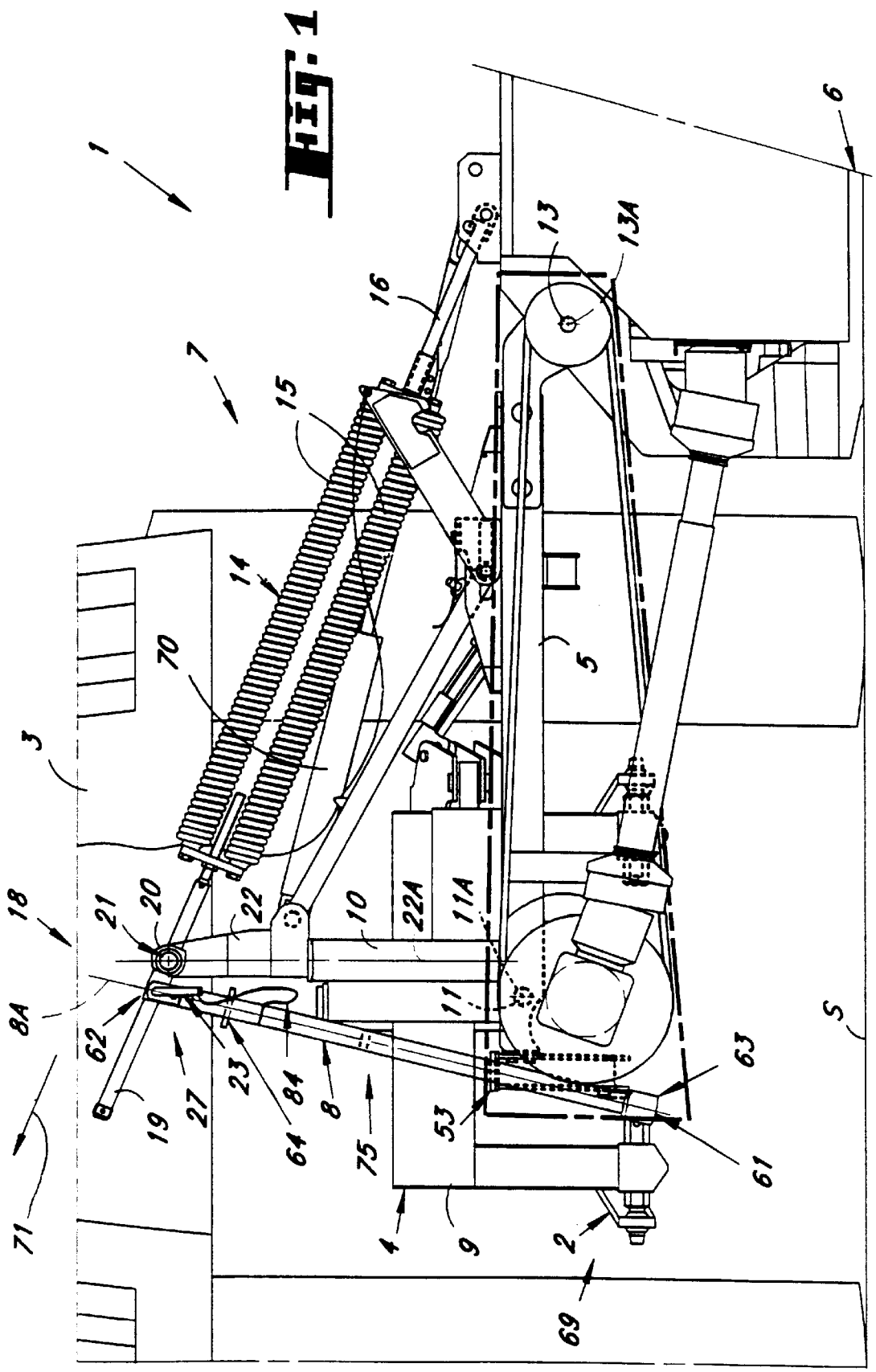
FIG. 1 represents, in the work position, a mower according to the invention, viewed from the rear and connected to a motor vehicle.

The mower (1) as represented in FIG. 1 is connected to the hitch device (2) of a motor vehicle (3).

This mower (1) is composed mainly of a hitch structure (4) connected to a carrying beam (5), a cutting mechanism (6), a lightening device (7) and a set-down member (8) of longitudinal axis (8A) extending in the work position, for the most part, above the carrying beam (5).

The hitch structure (4) includes a portal frame (9) by means of which the mower (1) is connected to the motor vehicle (3). Fitted between the carrying beam (5) and the portal frame (9) is a positioning arm (10) forming part of the hitch structure (4) and serving to bring the carrying beam (5) and the cutting mechanism (6) back toward the mid-plane of the motor vehicle (3) into a transport position (not represented), so as to make transport easier. The carrying beam (5) is connected at one of these ends to the positioning arm (10) by means of a first cylindrical articulation (11) with a longitudinal axis (11A) extending, in the work position, in the direction of travel during work (12). Connected to the other end of the carrying beam (5) by means of a second cylindrical articulation (13) with a longitudinal axis (13A) extending at least substantially parallel to the axis (11A) is the cutting mechanism (6).

The lightening device (7) includes an elastic element (14) intended to lighten the cutting mechanism (6) during work. This elastic element (14) is, in the example represented, composed of two draw-springs (15) connected on the one hand at one of their ends to a lower tie rod (16) which is itself connected to the cutting mechanism (6) and on the other hand to a control device (18).

The control device (18) includes a tie rod (19) connected on the one hand to the other end of the two draw-springs (15) and sliding on the other hand in a body (20) connected to the positioning arm (10) of the hitch structure (4) by means of a cylindrical articulation (21) with a longitudinal axis (21A) which is at least substantially parallel to the longitudinal axis (11A) of the first articulation (11) and by means of a journal (22) with a longitudinal axis (22A) which is at least substantially vertical.

In the work position, as represented in FIGS. 1, 4 and 5, the cutting mechanism (6) rests on the ground (S) and extends transversely to the direction of travel during work (12) and laterally to the motor vehicle (3). The sliding of the tie rod (19) in the body (20) is limited in the direction of the cutting mechanism (6) so as to tense the draw-springs (15) in order to lighten the cutting mechanism (6). For this purpose a stop element (23) is provided, said stop element including a pin (24) of round profile which extends on the one hand through a first housing (25) provided in the upper part (27) of the set-down member (8) and on the other hand through a second housing (28) provided in the tie rod (19), as represented in FIGS. 4 and 5. Thus in this work position the set-down member (8) is suspended to the tie rod (19) by means of the stop element (23).

There is in addition provided a locking device (29) preventing the stop element (23) from coming out of the second housing (28) provided in the tie rod (19) when the mower (1) is in the work position.

This locking device (29) involves the stop element (23) and the upper part (27) of the set-down member (8). For this purpose the upper part (27) of the set-down member (8) includes on the one hand a first component (30) extending in the extension of the set-down member (8) laterally to the latter and on the other hand a second, U-shaped component (32). This second component (32) includes two parallel lateral parts (33, 34) and a base (35). The lateral parts (33, 34) each include a hole (36, 37) with coincide longitudinal axes (36A, 37A) forming part of the housing (25). The pin (24) extends right through the holes (36, 37). The base (35) for its part has the tie rod (19) passing through it by means of a cut (39) made in said base (35).

The housing (25) also includes a hole (40) with a longitudinal axis (40A) which is coincident with the longitudinal axes (36A, 37A) of the holes (36, 37) made in the first component (30); the pin (24) also extends through the hole (40). The first component (30) also has an oblong hole (41) emerging radially in the hole (40). This oblong hole (41) points along the longitudinal axis (8A) of the set-down member (8) and, together with the hole (40), can be likened to a keyhole.

The first component (30) is welded to the set-down member (8) while the second component (32) is fixed to said first component (30) by means of two bolts (42) and a block (43). This block (43) extends between the first component (30) and the lateral part (34) of the second component (32) so as to create a space (44) above said block (43) and between the components (30 and 32). It will also be observed that the bolts (42) pass right through the block (43).

The pin (24) is composed on the one hand of an active part (46) extending in the work position at least substantially parallel to the longitudinal axis (21A) of the cylindrical articulation (21) and on the other hand of a handle (47) which is inclined with respect to said active part (46).

The active part (46) includes a locking element (48) extending, as represented in FIGS. 4 and 5, radially to said active part (46) in the opposite direction to the handle (47). In the work position, the locking element (48) extends in the space (44) and points vertically upward while the handle (47) extends downward under its own weight.

In this position, the locking element (48) is held captive between the first component (30) and the second component (32), thus locking the pin (24) in the work position.

The active part (46) of the pin (24) further includes a support part (49) which has a smaller diameter than the rest of the pin (24) and which, in the work position, comes to rest on the body (20) of the portal frame (9).

There is a shoulder (50, 51) at each end of the support part (49). In the work position the shoulder (50) extends between the body (20) of the portal frame (9) and the lateral part (33) of the second component (32), while the shoulder (51) extends between the body (20) and the lateral part (34).

It will be noted that in the work position the set-down member (8) is connected to the tie rod (19) by means of the pin (24) so as to allow relative motion between said set-down member (8) and said tie rod (19).

In the light of the various figures it may be seen that both in the work position and in the set-down position the set-down member (8) is also connected to the carrying beam (5) by means of a link (53). For this purpose, it may be seen from FIGS. 6 and 7 that the carrying beam (5) includes a housing (54) through which said set-down member (8) extends. This housing (54) is composed of an opening (55) provided in the carrying beam (5), in which opening the set-down member (8) can slide in order to be brought from the work position into the set-down position or vice versa.

The link (53) further includes a braking device (56) composed of an elastic element (58) fixed, above the opening (55), on the carrying beam (5) by means of bolts (59). The elastic element (58) extends, in the region of the opening (55), around the set-down member (8) until it comes into contact with the latter so as to brake the set-down member (8) while it is being handled, while at the same time allowing sliding.

Figure 3:
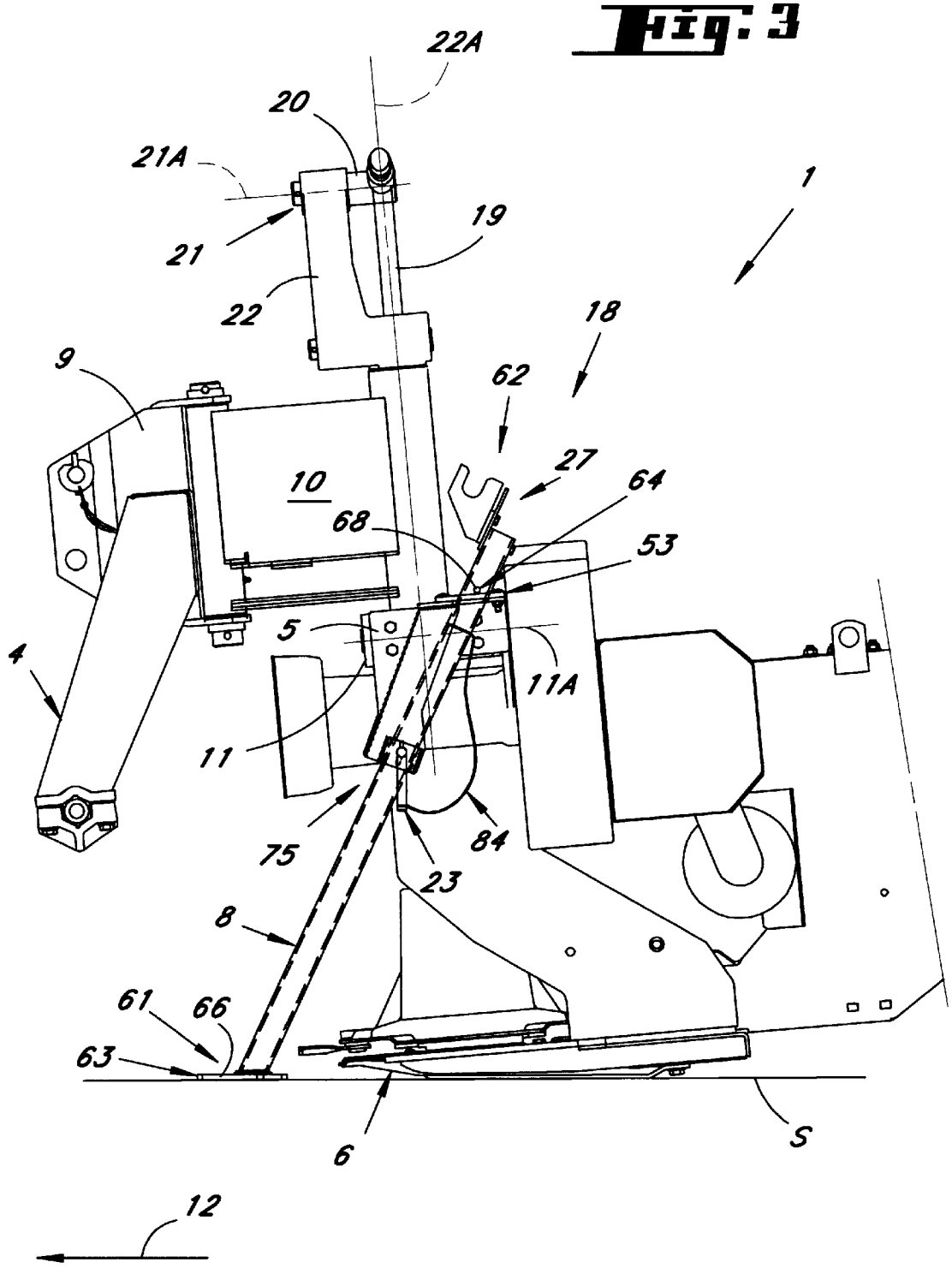
FIG. 3 represents, in the set-down position, the mower of FIGS. 1 and 2, viewed from the side.

It will also be noted that there is provided, as represented in FIGS. 3, 6 and 7, in the vicinity of each end (61, 62) of the set-down member (8), a stop (63, 64) intended to limit the sliding of the set-down member (8) in the opening (55).

The stop (63) is composed of a foot (66) fixed to the end (61) of the set-down member (8). This foot (66) is intended on the one hand to rest on the ground (S) in the set-down position and on the other hand to prevent upward extraction of the set-down member (8) out of the opening (55).

The stop (64) itself is composed, in the example represented, of a stop pin (68) situated under the upper part (27) of the set-down member (8).

This stop pin (68) passes transversely right through the set-down member (8) and extends on each side beyond said set-down member (8) so that in the set down position it comes to rest against the elastic element (58) of the braking device (56) in order to prevent downward extraction of said set-down member (8) from the opening (55).

It will be observed in addition, that in the work position, the set-down member (8) extends for the most part above the carrying beam (5).

In order to place the mower (1) from the work position into the set-down position, the operator has especially to bring the set-down member (8) into the set-down position as represented in FIGS. 3, 6 and 7.

It will be observed that in this set-down position the set-down member (8) extends for the most part below the carrying beam (5) and rests on the ground by means of the foot (66).

In order to do this the operator has firstly to withdraw the pin (24) from the first and second housing (25, 28) of the upper part (27) of the set-down member (8) and of the tie rod (19) so as to disconnect said set-down member (8) from said tie rod (19), which will allow him, secondly, to slide said set-down member (8) downward in the opening (55) provided in the carrying beam (5) and to connect this member to this beam by means of said pin (24).

Figure 2:
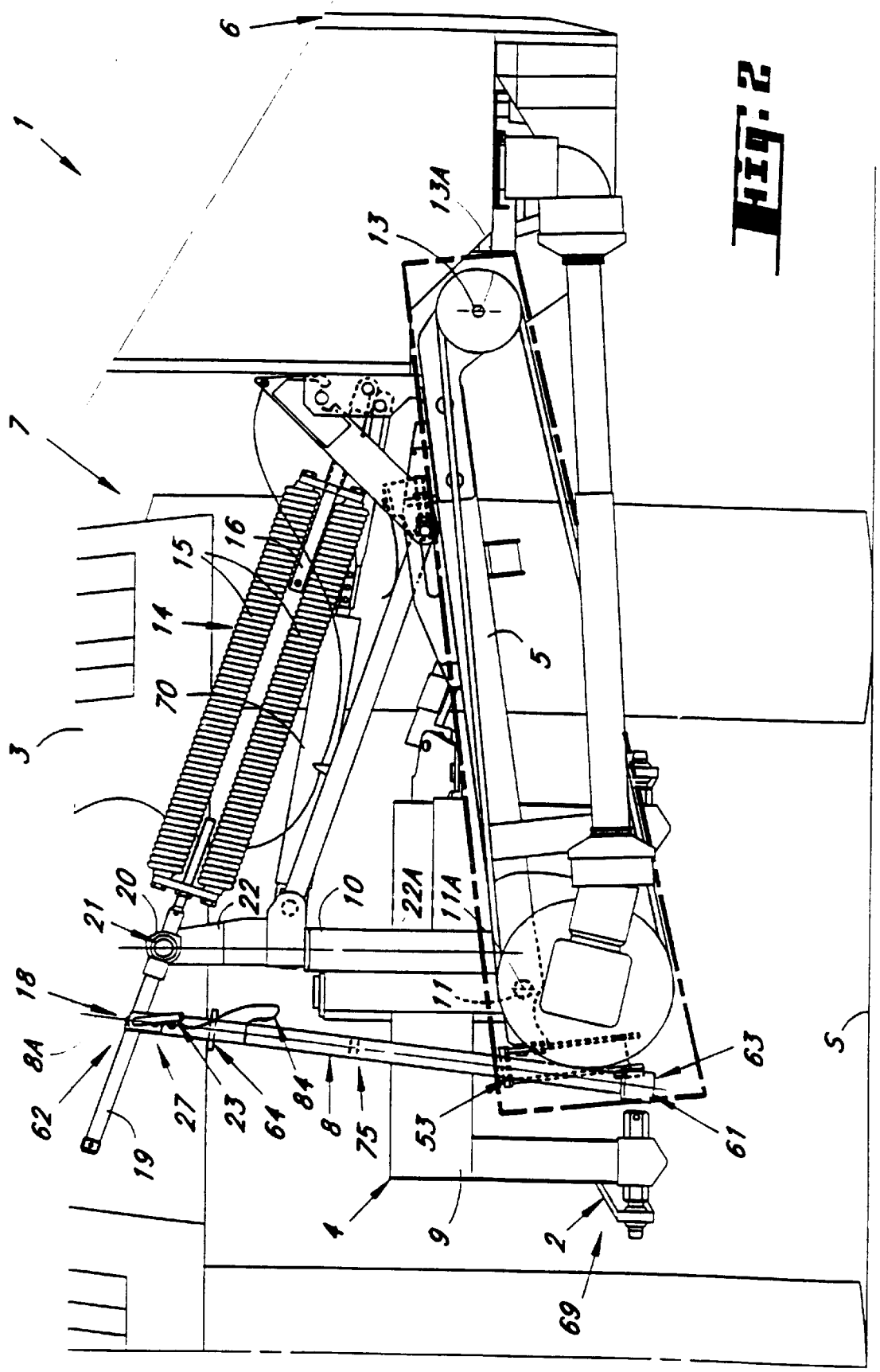
FIG. 2 represents the mower of FIG. 1, viewed from the rear with the cutting mechanism in its raised transport position.

The operator can only withdraw the pin (24) from the first and second housing (25, 28) when the following two conditions are met:

1. on the one hand the cutting mechanism (6) has to be in the transport position as represented in FIG. 2, and 2. on the other hand the operator has to act simultaneously on the set-down member (8) and on the pin (24).

Bringing the cutting mechanism (6) into the transport position from its work position is carried out roughly as follows:

firstly the operator actuates the hitch device (2) of the motor vehicle (3) which is also a hydraulic lift (69), which has the effect of shifting the mower (1) upward.

Next, the operator, from the motor vehicle (3), actuates a lifting ram (70) which especially allows the cutting mechanism (6) to be pivoted into an at least substantially vertical transport position (FIG. 2) about the longitudinal axis (13A) of the second cylindrical articulation (13). For this purpose, the draw-springs (15) relax and make the tie rod (19) slide in the body (20) in the direction of the arrow (71) represented in FIG. 1. The support part (49) of the active part (46) of the pin (24) no longer rests on the body (20) of the portal frame (9), so said pin (24) is no longer subjected to the stresses caused by the draw-springs (15), and this allows the operator to manipulate the pin (24) with ease.

In this transport position the set-down member (8) is suspended to the tie rod (19) by means of the pin (24), which has the effect of making the support part (49) of the active part (46) of said pin (24) rest on the bottom (72) of the second housing (28) under the self weight of said set-down member (8).

The action of the operator on the pin (24) consists firstly in turning the latter in the first housing (25) so as to bring the locking element (48) in front of the oblong hole (41) in order then to be able to pull on the pin (24) with a view to extracting it from the housings (25, 28) by causing said locking element (48) to pass through said oblong hole (41). The pin (24) will slide a little in the first and second housing (25, 28) until the shoulder (50) butts against the outer surface (73) of the tie rod (19). For that, the operator has also to act on the set-down member (8) to allow the rest of the operations.

The action of the operator on the set-down member (8) consists in raising the set-down member (8) and guiding it a little so that the shoulder (50) no longer butts against the tie rod (19) but passes through the second housing (28) so as to withdraw the pin (24) from the first and second housing (25, 28).

The fact that the operator has to act upon the set-down member (8) in order to withdraw the pin (24) automatically forces him to hold onto said set-down member (8) when the latter is disconnected from the tie rod, and this advantageously makes it possible to prevent the operator being caught unawares and injured should said set-down member (8) move unexpectedly.

If the operator should wish to withdraw the pin (24) from the housings (25, 28) when the mower (1) is in the work position, this proves to be an impossible operation, which advantageously makes it possible to avoid exposing the operator to an evident danger and to avoid damaging the mower (1).

When the mower (1) is in the work position the draw-springs (15) exert tension on the tie rod (19) and this has the effect of pressing the support part (49) of the active part (46) of the pin (24) onto the body (20) of the portal frame (9). Such an effect of the draw-springs (15) on the tie rod (19) and the pin (24) does not allow the latter to be withdrawn from the first and second housing (25, 28). Indeed, if the operator acts on the pin (24) with a view to extracting it from the housings (25, 28), then the shoulder (50) of said pin (24) butts against the outer surface (74) of the body (20).

As described earlier, in order to bring the set-down member (8) from the transport position into the set-down position, the operator, after having withdrawn the pin (24) from the housings (25, 28), slides said set-down member (8) at least substantially vertically downward in the opening (55) of the carrying beam (5) until the stop pin (68) butts against the elastic element (58) of the braking device (56). Next, all the operator need do is tilt the end (61) of the set-down member (8) in the direction of travel during work (12) in order to connect it easily to the carrying beam (5) by means of the pin (24). Finally, in order to bring the mower (1) from the transport position into the set-down position, the operator actuates the lifting ram (70) in order to make the cutting mechanism (6) pivot into an at least substantially horizontal position about the longitudinal axis (13A) of the second cylindrical articulation (13) and lowers the mower (1) by means of the hydraulic lift (69) of the motor vehicle (3) in order to rest it on the ground via the foot (66) of the set-down member (8) and the cutting mechanism (6). To finish off, all that remains is to disconnect the mower (1) from the hitch device (2) of the motor vehicle (3).

For this purpose, when putting the set-down member (8) in the set-down position, the middle part (75) of the set-down member (8) extends between two lateral walls (76, 77) of the carrying beam (5), and the pin (24) extends on the one hand through a third housing (78) provided in the middle part (75) of said set-down member (8) and on the other hand through a fourth housing (79) provided in the carrying beam (15), as represented in FIGS. 3, 6 and 7.

It will be observed that, in the set-down position, the set-down member (8) is connected to the carrying beam (5) on the one hand by means of the pin (24) so as to allow relative motion between said set-down member (8) and said carrying beam (5) and on the other hand by means of the link (53).

Under the self weight of the hitch structure (4), the set-down member (8) comes to rest on one of the sides of the opening (55) of the housing (54) of the carrying beam (5) and said set-down member (8) is fixed to the carrying beam (5). Here too, there is provided a locking device (83) which prevents the stop element (23) from coming out of the housings (78, 79) when the mower (1) is in the set-down position. This locking device (83) is in principle of the same type as the locking device (29).

The operator can only withdraw the pin (24) from the third and fourth housing (78, 79) when the following conditions are met:

on the one hand the mower (1) has to be raised by means of the hydraulic lift (69) of the motor vehicle (3) so that the set-down member (8) no longer rests on the ground (S); and on the other hand the operator has to act simultaneously on the set-down member (8) and on the pin (24) for the same reasons as set out earlier.

Placing the mower (1) in the transport position and placing it in the work position from the set-down position are carried out in the reverse way to what was described earlier for bringing the mower (1) into the transport and set-down position.

It will further be noted that the pin (24) of the stop element (23) is connected to the set-down member (8) by means of a linking element (84) which, according to this embodiment as represented, is a cable (85). This cable (85) is fixed to the set-down member (8) and is of a length which is determined so that:

the length of said cable (85) is short enough not to allow the set-down member (8) to be brought into the set-down position when only the pin (24) is connected to the tie rod;

the length of said cable (85) is long enough to allow the set-down member (8) to come at least into close proximity with the ground (S) when only the pin (24) is connected to the tie rod (19).

Finally, various modifications remain possible within the scope of the invention described herein, especially as regards the construction of the various elements or as regards the substitution of technical equivalents.

What is claimed as new and desired to be secured by Letters Patent of the United States is:

1. A mower which includes:
   a cutting mechanism extending, in a work position, transversely to the direction of travel during work;
   a hitch structure connectable to the hitch device of a motor vehicle;
   a carrying beam articulated to the hitch structure by a first articulation member and to the cutting mechanism by a second articulation member;
   a lightening device which includes:
     an elastic element to lighten the cutting mechanism in the work position, and
     a control device which includes:
       a body connected to the hitch structure by a third articulation member;
       a tie rod connected to one of the ends of said elastic element and sliding in said body;

a stop element limiting, at least in one direction, sliding of said tie rod with respect to the body;

a set-down member connected, in a set-down position, to the carrying beam by said stop element; wherein, in the work position, the set-down member is connected to the tie rod by said stop element.

2. The mower as claimed in claim 1, wherein both in the work position and in the set-down position, the set-down member is also connected to the carrying beam by a link.

3. The mower as claimed in claim 2, wherein the carrying beam includes, for said link, a housing through which said set-down member extends.

4. The mower as claimed in claim 3, wherein the housing of the carrying beam is an opening in which the set-down member is slidable in order to be brought from the work position into the set-down position or vice versa.

5. The mower as claimed in claim 4, which comprises, close to each end of the set-down member, a stop limiting the sliding of the set-down member in the opening.

6. The mower as claimed in claim 1, wherein, in the work position, the set-down member is suspended from the tie rod of the control device by the stop element.

7. the mower as claimed in claim 1, wherein:

in the work position, the set-down member extends above the carrying beam;

and in the set-down position, the set-down member extends below the carrying beam.

8. The mower as claimed in claim 1, wherein, in the work position, the stop element extends through a first housing provided in the upper part of the set-down member and through a second housing provided in the tie rod.

9. the mower as claimed in claim 8, which comprises a locking device preventing the stop element from coming out of the second housing provided in the tie rod when the mower is in the work position.

10. The mower as claimed in claim 9, wherein the locking device includes the stop element and the upper part of the set-down member.

11. The mower as claimed in claim 1, wherein in order to disconnect the set-down member from the tie rod it is necessary to act simultaneously on said set-down member and on the stop element.

12. The mower as claimed in claim 1, wherein, in the set down position, the stop element extends on the one hand through a third housing provided in the middle part of the set-down member and on the other hand through a fourth housing provided in the carrying beam.

13. The mower as claimed in claim 1, wherein the stop element is connected to the set-down member by means of a linking member.

14. The mower as claimed in claim 13, wherein the linking member is of a length determined so that:

the length of said linking element is short enough not to allow the set-down member to be placed in the set-down position when only the stop element is connected to tie rod;

the length of said linking element is long enough to allow the set-down member to come at least into close proximity with the ground when only the stop element is connected to the tie rod.

15. The mower as claimed in claim 1, wherein the stop element is a pin.

* * * * *